US011696232B2

(12) United States Patent
Xu et al.

(10) Patent No.: US 11,696,232 B2
(45) Date of Patent: *Jul. 4, 2023

(54) SEARCH SPACE SET FOR WAKEUP SIGNAL

(71) Applicant: QUALCOMM Incorporated, San Diego, CA (US)

(72) Inventors: Huilin Xu, San Diego, CA (US); Peter Pui Lok Ang, San Diego, CA (US); Wooseok Nam, San Diego, CA (US); Gabi Sarkis, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 60 days.

This patent is subject to a terminal disclaimer.

(21) Appl. No.: 17/115,501

(22) Filed: Dec. 8, 2020

(65) Prior Publication Data

US 2021/0092682 A1    Mar. 25, 2021

Related U.S. Application Data

(63) Continuation of application No. 16/805,422, filed on Feb. 28, 2020, now Pat. No. 10,887,839.

(Continued)

(51) Int. Cl.
*H04W 52/02* (2009.01)
*H04W 72/23* (2023.01)

(52) U.S. Cl.
CPC ....... *H04W 52/0235* (2013.01); *H04W 72/23* (2023.01)

(58) Field of Classification Search
CPC ........... H04W 72/042; H04W 52/0235; H04W 56/001; H04W 52/0216; H04W 52/0219;
(Continued)

(56) References Cited

U.S. PATENT DOCUMENTS 8,185,726 B2 * 5/2012 Taha ................. H04W 52/0229
713/1
9,264,997 B2 * 2/2016 Gaal ..................... H04L 5/0048
(Continued)

FOREIGN PATENT DOCUMENTS

TW      201842801 A    12/2018
WO   2018174635 A1    9/2018
(Continued)

OTHER PUBLICATIONS

"Correction on PDCCH monitoring with pdcch-Blind-DetectionCA"; Ericsson; 3GPP TSG-RAN WG1 Meeting #96 R1-1901854 Athens, Greece, Feb. 25-Mar. 1, 2019 (Year: 2019).*
(Continued)

*Primary Examiner* — Benjamin H Elliott, IV
(74) *Attorney, Agent, or Firm* — Harrity & Harrity, LLP

(57) ABSTRACT

Various aspects of the present disclosure generally relate to wireless communication. In some aspects, a user equipment (UE) may monitor a wakeup signal search space (WUS-SS) set for a physical downlink shared channel (PDCCH) wakeup signal (WUS). The UE may detect the PDCCH WUS in the WUS-SS set based at least in part on monitoring the WUS-SS set. Numerous other aspects are provided.

30 Claims, 7 Drawing Sheets

Related U.S. Application Data

(60) Provisional application No. 62/826,741, filed on Mar. 29, 2019.

(58) Field of Classification Search
CPC ......... H04W 52/0229; H04W 56/0015; H04W 76/28; H04W 72/1284; H04W 74/0833
See application file for complete search history.

(56) References Cited

U.S. PATENT DOCUMENTS

| | | | |
|---|---|---|---|
| 10,887,839 B2* | 1/2021 | Xu | H04L 5/0053 |
| 2005/0063331 A1* | 3/2005 | Kim | H04W 52/0235 370/328 |
| 2012/0033646 A1* | 2/2012 | Luo | H04W 48/20 370/336 |
| 2012/0275364 A1* | 11/2012 | Anderson | H04W 52/0222 370/311 |
| 2014/0064170 A1* | 3/2014 | Seo | H04W 52/0235 370/311 |
| 2014/0092792 A1 | 4/2014 | Kim et al. | |
| 2014/0226682 A1* | 8/2014 | Becker | H04L 1/0028 370/474 |
| 2015/0003311 A1* | 1/2015 | Feuersaenger | H04W 76/28 370/311 |
| 2016/0036617 A1* | 2/2016 | Luo | H04L 5/0048 375/260 |
| 2016/0128056 A1* | 5/2016 | Jiang | H04L 5/0092 370/329 |
| 2016/0183112 A1* | 6/2016 | Yang | H04L 5/0053 370/252 |
| 2016/0227502 A1* | 8/2016 | Vos | H04W 56/0015 |
| 2016/0373237 A1* | 12/2016 | Shellhammer | H04L 5/0007 |
| 2017/0094621 A1* | 3/2017 | Xu | H04L 7/00 |
| 2017/0264406 A1* | 9/2017 | Lei | H04J 11/0069 |
| 2018/0255515 A1* | 9/2018 | Gupta Hyde | H04W 52/0235 |
| 2018/0332533 A1 | 11/2018 | Bhattad et al. | |
| 2019/0036754 A1* | 1/2019 | Lee | H04W 52/0235 |
| 2019/0150073 A1* | 5/2019 | Tiirola | H04W 72/10 455/434 |
| 2019/0223164 A1* | 7/2019 | He | H04W 72/042 |
| 2019/0254110 A1* | 8/2019 | He | H04L 41/0896 |
| 2020/0037247 A1* | 1/2020 | Liao | H04W 52/0216 |
| 2020/0037396 A1* | 1/2020 | Islam | H04W 88/06 |
| 2020/0092813 A1* | 3/2020 | Kim | H04L 1/0072 |
| 2020/0100179 A1* | 3/2020 | Zhou | H04W 72/042 |
| 2020/0280959 A1* | 9/2020 | Sharma | H04W 52/0219 |
| 2020/0314756 A1* | 10/2020 | Xu | H04W 52/0235 |
| 2021/0092682 A1* | 3/2021 | Xu | H04W 72/042 |
| 2021/0168781 A1* | 6/2021 | Lee | H04L 25/02 |
| 2021/0306951 A1* | 9/2021 | Hwang | H04W 68/02 |

FOREIGN PATENT DOCUMENTS

| | | |
|---|---|---|
| WO | 2018175760 A1 | 9/2018 |
| WO | 2018203281 A1 | 11/2018 |
| WO | 2018231036 A1 | 12/2018 |

OTHER PUBLICATIONS

"BD/CCE limit for cross-carrier scheduling with different numerologies"; Panasonic; 3GPP TSG RAN WG1 #96 R1-1902840 Athens, Greece, Feb. 25-Mar. 1, 2019 (Year: 2019).*
"Considerations for limiting the PDCCH blind decoding candidates"; Nokia et al.; 3GPP TSG RAN WG1 #96 R1-1903137 Athens, Greece, Feb. 25-Mar. 1, 2019 (Year: 2019).*
"Idle mode ANR Measurements for NB-IoT"; Nokia et al.; 3GPP TSG RAN WG2 Meeting #105 R2-1900325 Athens, Greece, Feb. 25-Mar. 1, 2019 (Year: 2019).*
"UE-group wake-up signal in LTE-MTC"; Ericsson; 3GPP TSG-RAN WG1 Meeting #96 R1-1901737 Athens, Greece, Feb. 25-Mar. 1, 2019 (Year: 2019).*
"Support of sub-groups for MWUS"; Huawei et al; 3GPP TSG RAN WG1 Meeting #96 R1-1901514 Athens, Greece, Feb. 25-Mar. 1, 2019 (Year: 2019).*
"Analysis and evaluation of wake up signaling scheme"; Huawei et al.; 3GPP TSG RAN WG1 Ad-Hoc Meeting 1901 R1-1901246 Taipei, Jan. 21-25, 2019 (Year: 2019).*
KR 20200031446A; Korean published application No. KR-2018-0110465, published Mar. 24, 2020 (Year: 2020).*
Ericsson., "DRX with Short on-duration and Wake-up Signaling", R2-1708189, 3GPP TSG-RAN WG2 #99 Tdoc, R2-1708189, Berlin, Germany, Aug. 21-25, 2017 (Year: 2017), 3 pages.
International Search Report and Written Opinion—PCT/US2020/020589—ISAEPO—Jun. 15, 2020.
Qualcomm Inc: "Wake-Up Schemes for DRX in NR", R2-1701774, 3GPP TSG-RAN WG2 Meeting #97 R2-1701774, Athens, Greece, Feb. 13-17, 2017 (Year: 2017), 4 pages.
Qualcomm Incorporated, et al., "Wake-up Signaling for C-DRX Mode", 3GPP Draft, 3GPP TSG RAN WG2 NR #99, R2-1709652 Wake-up Signaling for C-DRX Mode, 3rd Generation Partnership Project (3GPP), Mobile Competence Centre, 650, Route Des Lucioles, F-06921, Sophia-Antipolis Cedex, France, vol. RAN WG2, No. Berlin, Germany, Aug. 21, 2017-Aug. 25, 2017, Aug. 20, 2017, XP051319364, 6 pages, Retrieved from the Internet: URL: http://www.3gpp.org/ftp/Meetings_3GPP_SYNC/RAN2/Docs/, [retrieved on Aug. 20, 2017].
Qualcomm Incorporated: "PDCCH-Based PowerSaving Channel Design", 3GPP Draft, 3GPP TSG-RAN WG1 #98, R1-1909275 PDCCH-Based PowerSaving Channel Design, 3rd Generation Partnership Project (3GPP), Mobile Competence Centre, 650, Route Des Lucioles, F-06921 Sophia-Antipolis Cedex, France, vol. RAN WG1, No. Prague, Czech Republic, Aug. 26, 2019-Aug. 30, 2019, Aug. 17, 2019 (Aug. 17, 2019), XP051765880, pp. 1-11, Retrieved from the Internet: URL: http://www.3gpp.org/ftp/tsg_ran/WG1_RL1/TSGR1_98/Docs/R1-1909275.zip, [retrieved on Aug. 17, 2019], the whole document.
Qualcomm Incorporated: "Wake-Up Schemes for DRX in NR", 3GPP Draft; R2-1700568 Wake-Up Proposal, 3rd Generation Partnership Project (3GPP), Mobile Competence Centre; 650, Route Des Lucioles; F-06921 Sophia-Antipolis Cedex; France, vol. RAN WG2, No. Spokane, US; Jan. 17, 2017-Jan. 19, 2017 Jan. 17, 2017 (Jan. 17, 2017), XP051211140, Retrieved from the Internet: URL:http://www.3gpp.org/ftp/Meetings_3GPP_SYNC/RAN2/Docs/ [retrieved on Jan. 17, 2017], 4 pages.
Qualcomm Incorporated: "Wake-Up Schemes for DRX in NR", 3GPP Draft; R2-1706524 Wake-Up Schemes for DRX, 3rd Generation Partnership Project (3GPP), Mobile Competence Centre; 650, Route Des Lucioles; F-06921 Sophia-Antipolis Cedex; France, vol. RAN WG2, No. Qingdao. China; Jun. 27, 2017-Jun. 29, 2017 Jun. 17, 2017, XP051307043, Retrieved from the Internet: URL:http://www.3gpp.org/ftp/tsg_ran/WG2_RL2/TSGR2_AHs/2017_06_NR/Docs/[retrieved on Jun. 17, 2017], 4 pages.
Qualcomm Incorporated: "Wake-Up Signaling for C-DRX", 3GPP Draft; R2-1709115 Wake-Up Signaling for C-DRX, 3rd Generation Partnership Project (3GPP), Mobile Competence Centre; 650, Route Des Lucioles; F-06921 Sophia-Antipolis Cedex; France, vol. RAN WG2, No. Berlin, Germany; Aug. 21, 2017-Aug. 25, 2017 Aug. 20, 2017, XP051318908, Retrieved from the Internet: URL:http://www.3gpp.org/ftp/Meetings_3GPP_SYNC/RAN2/Docs/[retrieved on Aug. 20, 2017], 5 pages.
Qualcomm: "Wakeup Signaling for Multi-Beam Systems", 3GPP TSG-RAN WG2 Meeting RAN2 #99, 3GPP Draft; R2-1709116 Wakeup Signaling for Multi -Beam Systems, 3rd Generation Partnership Project (3GPP), Mobile Competence Centre; 650, Route Des Lucioles; F-06921 Sophia-Antipolis Cedex; France, vol. RAN WG2. No. Berlin, Germany; Aug. 21, 2017-Aug. 25, 2017, Aug. 20, 2017, 4 Pages, XP051318909, Retrieved from the Internet: URL: http://www.3gpp.org/ftp/Meetings_3GPP_SYNC/RAN2/Docs/ [retrieved on Aug. 20, 2017].
VIVO: "Remaining Issue on PDCCH Coreset", 3GPP Draft, 3GPP TSG RAN WG1 Meeting #93, R1-1806055_ Remaining Issue on PDCCH CORESET, 3rd Generation Partnership Project (3GPP), Mobile Competence Centre, 650, Route Des Lucioles, F-06921 Sophia-Antipolis Cedex, France, vol. RAN WG1, No. Busan,

(56) References Cited

OTHER PUBLICATIONS

Korea, May 21, 2018-May 25, 2018, May 12, 2018, XP051462320, pp. 1-4, Retrieved from the Internet: URL: http://www.3gpp.org/ftp/tsg%5Fran/WG1%5FRL1/TSGR1%5F93/Docs, [retrieved on May 12, 2018], Section 2.1.

ZTE: "Discussion on Potential Techniques for UE Power Saving", 3GPP Draft, 3GPP TSG RAN WG1 Meeting #96, R1-1902031 Discussion on Potential Techniques for UE Power Saving-FINAL. 3rd Generation Partnership Project (3GPP), Mobile Competence Centre, 650, Route Des Lucioles, F-06921 Sophia-Anti, vol. RAN WG1, No. Athens, Greece, Feb. 25, 2019-Mar. 1, 2019, Feb. 16, 2019 (Feb. 16, 2019), XP051599727, pp. 1-22, Retrieved from the Internet: URL: http://www.3gpp.org/ftp/tsg%5Fran/WG1%5FRL1/TSGR1%5F96/Docs/R1%2D1902031%2Ezip, [retrieved on Feb. 16, 2019], p. 8, paragraph 3.5—p. 9. Paragraph 3.5, p. 15. paragraph 4.3.2—p. 16, paragraph 4.3.2, figures 8. 13.

Taiwan Search Report—TW109106711—TIPO—dated Mar. 12, 2023.

\* cited by examiner

SEARCH SPACE SET FOR WAKEUP SIGNAL

CROSS-REFERENCE TO RELATED APPLICATIONS

This application is a continuation of U.S. patent application Ser. No. 16/805,422, entitled "SEARCH SPACE SET FOR WAKEUP SIGNAL," filed Feb. 28, 2020, which claims priority to U.S. Provisional Patent Application No. 62/826,741, filed on Mar. 29, 2019, entitled "SEARCH SPACE SET FOR WAKEUP SIGNAL," which are hereby expressly incorporated by reference herein.

FIELD OF THE DISCLOSURE

Aspects of the present disclosure generally relate to wireless communication, and more particularly to techniques and apparatuses for search space set for wakeup signal.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UNITS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunication standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include monitoring a wakeup signal search space (WUS-SS) set for a physical downlink shared channel (PDCCH) wakeup signal (WUS) and detecting the PDCCH WUS in the WUS-SS set based at least in part on monitoring the WUS-SS set.

In some aspects, a UE for wireless communication may include memory and one or more processors operatively coupled to the memory. The memory and the one or more processors may be configured to monitor a WUS-SS set for a PDCCH WUS and detect the PDCCH WUS in the WUS-SS set based at least in part on monitoring the WUS-SS set.

In some aspects, a non-transitory computer-readable medium may store one or more instructions for wireless communication. The one or more instructions, when executed by one or more processors of a UE, may cause the one or more processors to monitor a WUS-SS set for a PDCCH WUS and detect the PDCCH WUS in the WUS-SS set based at least in part on monitoring the WUS-SS set.

In some aspects, an apparatus for wireless communication may include means for monitoring a WUS-SS set for a PDCCH WUS and means for detecting the PDCCH WUS in the WUS-SS set based at least in part on monitoring the WUS-SS set.

Aspects generally include a method, apparatus, system, computer program product, non-transitory computer-readable medium, user equipment, base station, wireless communication device, and processing system as substantially described herein with reference to and as illustrated by the accompanying, drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It is noted that while aspects may be described herein using terminology commonly associated with 3G and/or 4G wireless technologies, aspects of the present disclosure can be applied in other generation-based communication systems, such as 5G and later, including NR technologies.

Figure 1:
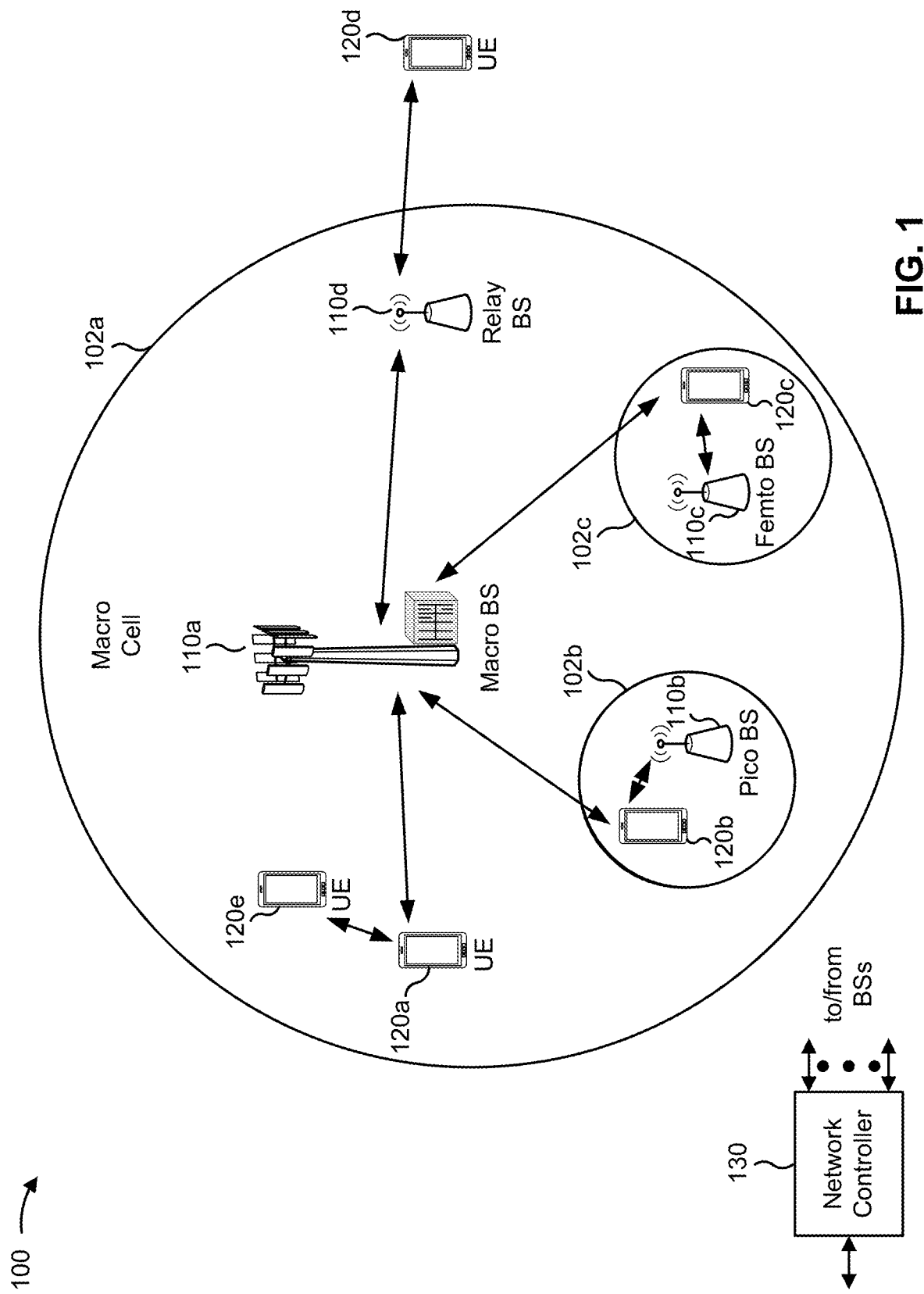
FIG. 1 is a block diagram conceptually illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
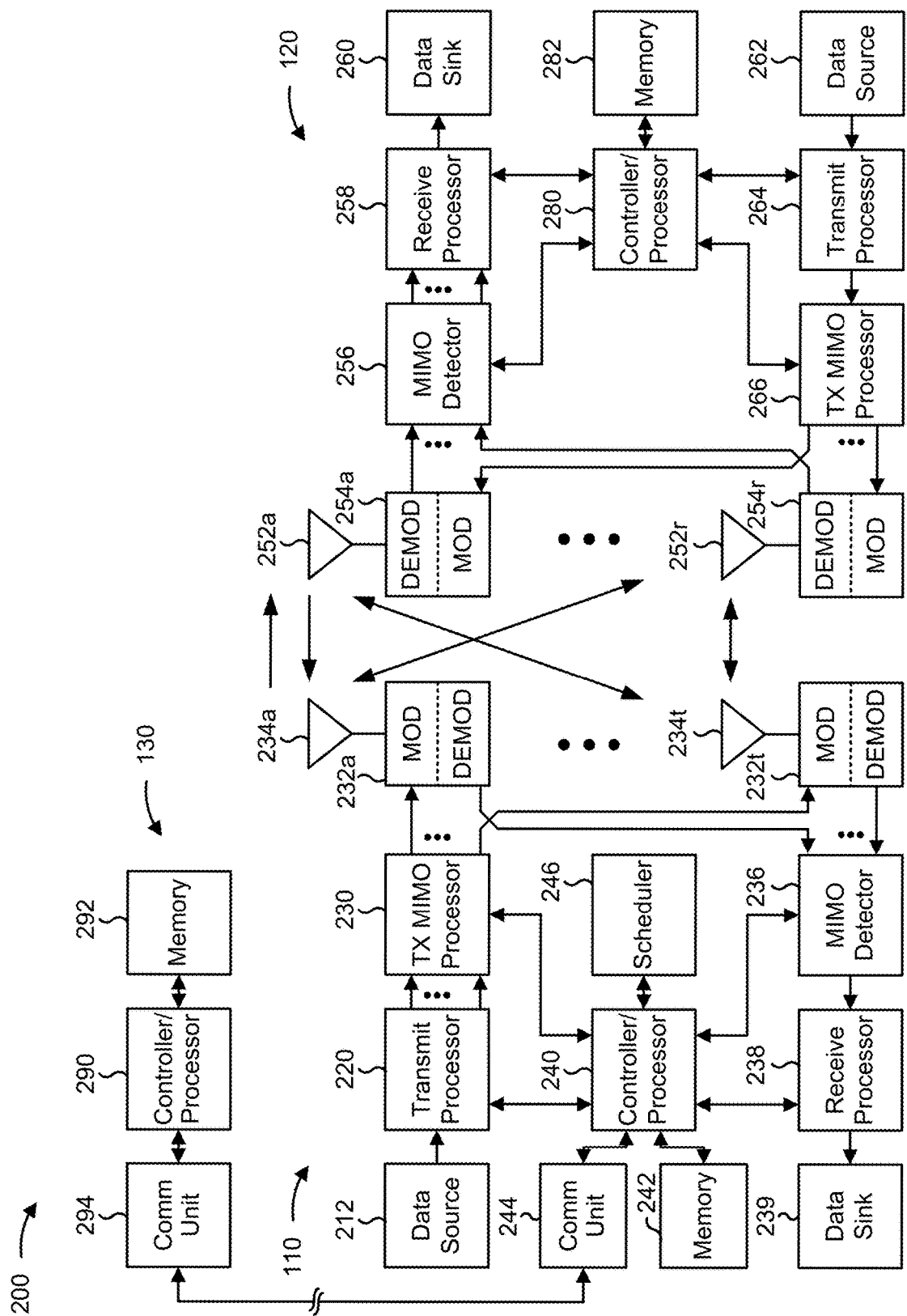
FIG. 2 is a block diagram conceptually illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with search space set for wakeup signal, as described in more detail elsewhere herein. For example, controller/processor 240 of base station 110, controller/processor 280 of UE 120, and/or any other component(s) of FIG. 2 may perform or direct operations of, for example, process 600 of FIG. 6, and/or other processes as described herein. Memories 242 and 282 may store data and program codes for base station 110 and UE 120, respectively. A scheduler 246 may schedule UEs for data transmission on the downlink and/or uplink.

In some aspects, UE 120 may include means for monitoring a wakeup signal search space (WUS-SS) set for a physical downlink shared channel (PDCCH) wakeup signal (WUS), means for detecting the PDCCH WUS in the WUS-SS set based at least in part on monitoring the WUS-SS set, and/or the like. In some aspects, such means may include one or more components of UE 120 described in connection with FIG. 2.

As indicated above, FIG. 2 is provided as an example. Other examples may differ from what is described with regard to FIG. 2.

Figure 3A:
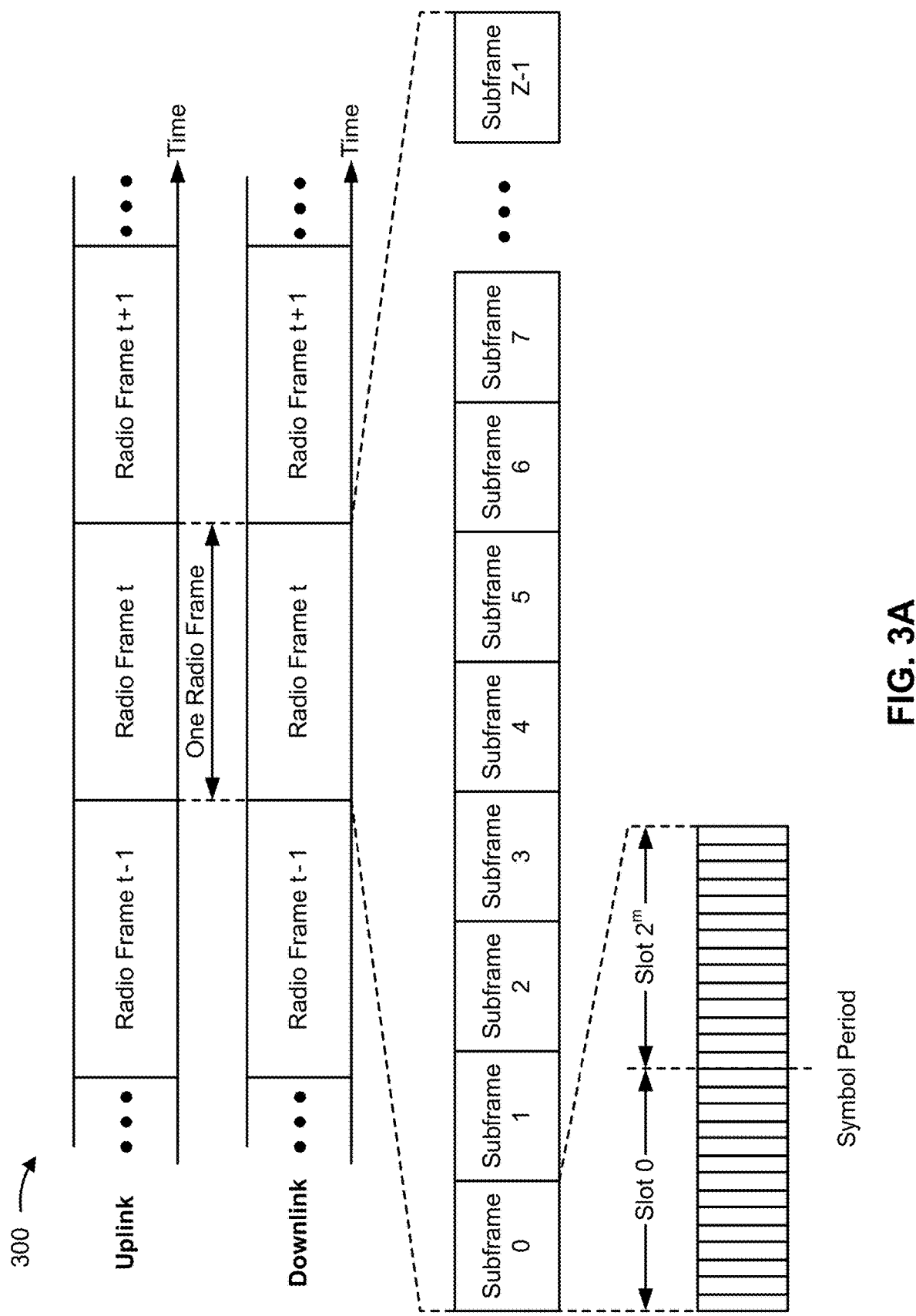
FIG. 3A is a block diagram conceptually illustrating an example of a frame structure in a wireless communication network, in accordance with various aspects of the present disclosure.

FIG. 3A shows an example frame structure 300 for frequency division duplexing (FDD) in a telecommunications system (e.g., NR). The transmission timeline for each of the downlink and uplink may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 3A, where m is a numerology used for a transmission, such as 0, 1, 2, 3, 4, and/or the like). Each slot may include a set of L symbol periods. For example, each slot may include fourteen symbol periods (e.g., as shown in FIG. 3A), seven symbol periods, or another number of symbol periods. In a case where the subframe includes two slots (e.g., when m=1), the subframe may include 2L symbol periods, where the 2L symbol periods in each subframe may be assigned indices of 0 through 2L−1. In some aspects, a scheduling unit for the FDD may be frame-based, subframe-based, slot-based, symbol-based, and/or the like.

While some techniques are described herein in connection with frames, subframes, slots, and/or the like, these techniques may equally apply to other types of wireless communication structures, which may be referred to using terms other than "frame," "subframe," "slot," and/or the like in 5G NR. In some aspects, a wireless communication structure may refer to a periodic time-bounded communication unit defined by a wireless communication standard and/or protocol. Additionally, or alternatively, different configurations of wireless communication structures than those shown in FIG. 3A may be used.

In certain telecommunications (e.g., NR), a base station may transmit synchronization signals. For example, a base station may transmit a primary synchronization signal (PSS), a secondary synchronization signal (SSS), and/or the like, on the downlink for each cell supported by the base station. The PSS and SSS may be used by UEs for cell search and acquisition. For example, the PSS may be used by UEs to determine symbol timing, and the SSS may be used by UEs to determine a physical cell identifier, associated with the base station, and frame timing. The base station may also transmit a physical broadcast channel (PBCH). The PBCH may carry some system information, such as system information that supports initial access by UEs.

In some aspects, the base station may transmit the PSS, the SSS, and/or the PBCH in accordance with a synchronization communication hierarchy (e.g., a synchronization signal (SS) hierarchy) including multiple synchronization communications (e.g., SS blocks), as described below in connection with FIG. 3B.

Figure 3B:
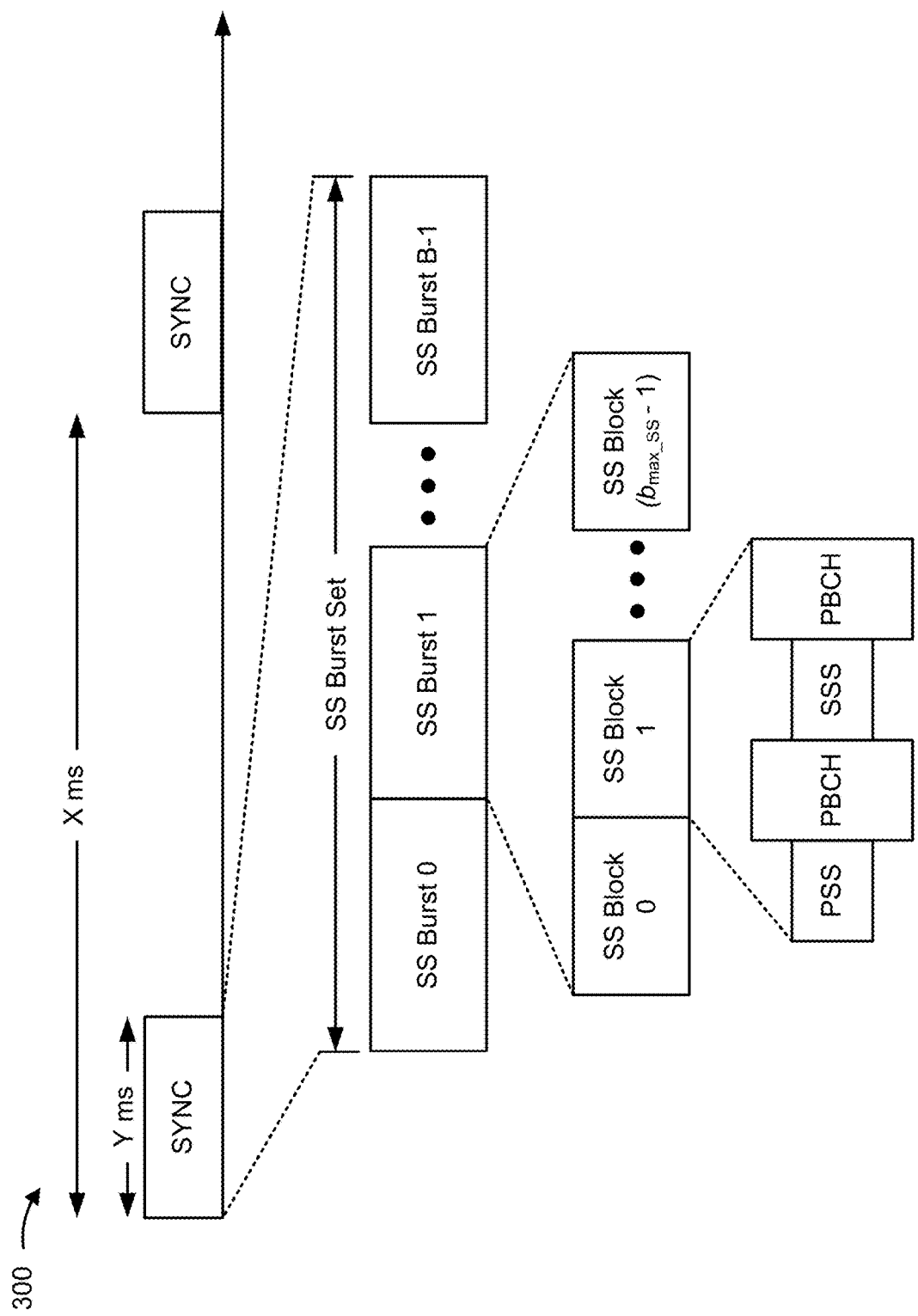
FIG. 3B is a block diagram conceptually illustrating an example synchronization communication hierarchy in a wireless communication network, in accordance with various aspects of the present disclosure.

FIG. 3B is a block diagram conceptually illustrating an example SS hierarchy, which is an example of a synchronization communication hierarchy. As shown in FIG. 3B, the SS hierarchy may include an SS burst set, which may include a plurality of SS bursts (identified as SS burst 0 through SS burst B−1, where B is a maximum number of repetitions of the SS burst that may be transmitted by the base station). As further shown, each SS burst may include one or more SS blocks (identified as SS block 0 through SS block ($b_{max\_ss-1}$), where $b_{max\_ss-1}$ is a maximum number of SS blocks that can be carried by an SS burst). In some aspects, different SS blocks may be beam-formed differently. An SS burst set may be periodically transmitted by a wireless node, such as every X milliseconds, as shown in FIG. 3B. In some aspects, an SS burst set may have a fixed or dynamic length, shown as Y milliseconds in FIG. 3B.

The SS burst set shown in FIG. 3B is an example of a synchronization communication set, and other synchronization communication sets may be used in connection with the techniques described herein. Furthermore, the SS block shown in FIG. 3B is an example of a synchronization communication, and other synchronization communications may be used in connection with the techniques described herein.

In some aspects, an SS block includes resources that carry the PSS, the SSS, the PBCH, and/or other synchronization signals (e.g., a tertiary synchronization signal (TSS)) and/or synchronization channels. In some aspects, multiple SS blocks are included in an SS burst, and the PSS, the SSS, and/or the PBCH may be the same across each SS block of the SS burst. In some aspects, a single SS block may be included in an SS burst. In some aspects, the SS block may be at least four symbol periods in length, where each symbol carries one or more of the PSS (e.g., occupying one symbol), the SSS (e.g., occupying one symbol), and/or the PBCH (e.g., occupying two symbols).

In some aspects, the symbols of an SS block are consecutive, as shown in FIG. 3B. In some aspects, the symbols of an SS block are non-consecutive. Similarly, in some aspects, one or more SS blocks of the SS burst may be transmitted in consecutive radio resources (e.g., consecutive symbol periods) during one or more slots. Additionally, or alternatively, one or more SS blocks of the SS burst may be transmitted in non-consecutive radio resources.

In some aspects, the SS bursts may have a burst period, whereby the SS blocks of the SS burst are transmitted by the base station according to the burst period. In other words, the SS blocks may be repeated during each SS burst. In some aspects, the SS burst set may have a burst set periodicity, whereby the SS bursts of the SS burst set are transmitted by the base station according to the fixed burst set periodicity. In other words, the SS bursts may be repeated during each SS burst set.

The base station may transmit system information, such as system information blocks (SIBs) on a physical downlink shared channel (PDSCH) in certain slots. The base station may transmit control information/data on a physical downlink control channel (PDCCH) in C symbol periods of a slot, where B may be configurable for each slot. The base station may transmit traffic data and/or other data on the PDSCH in the remaining symbol periods of each slot.

As indicated above, FIGS. 3A and 3B are provided as examples. Other examples may differ from what is described with regard to FIGS. 3A and 3B.

Figure 4:
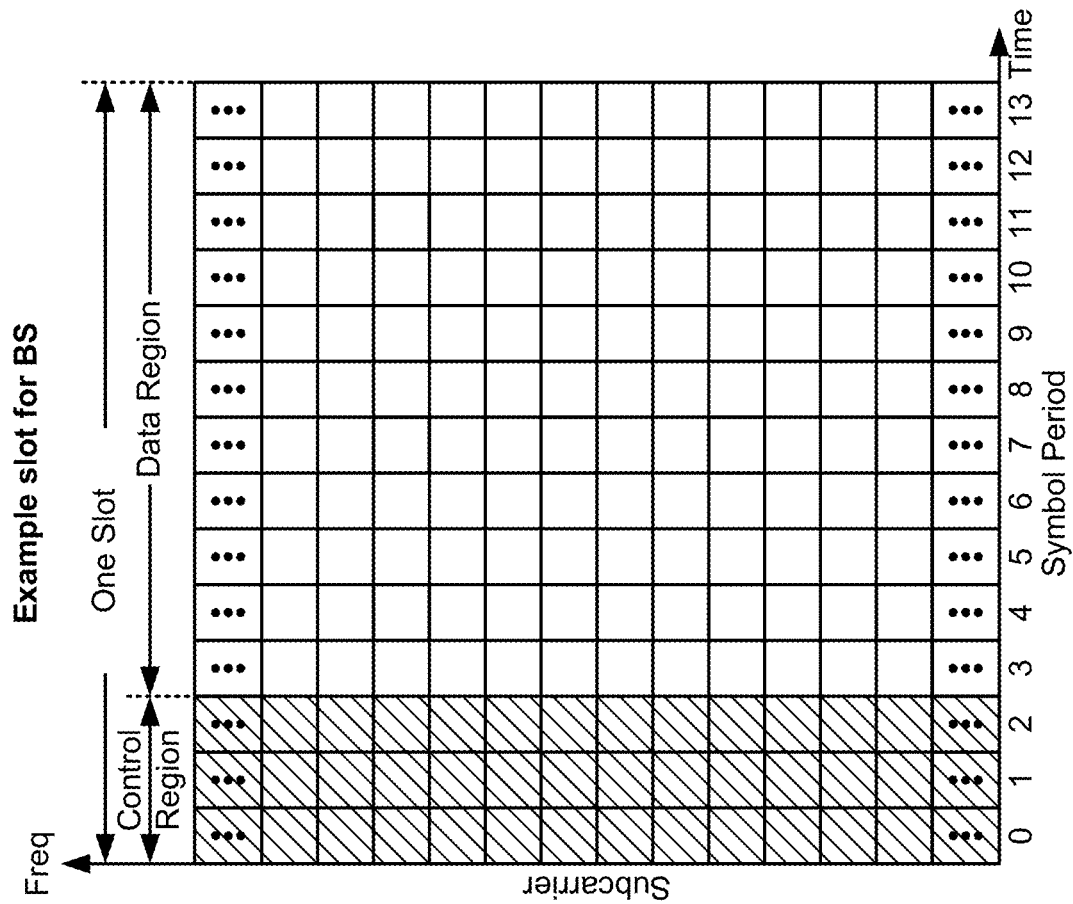
FIG. 4 is a block diagram conceptually illustrating an example slot format with a normal cyclic prefix, in accordance with various aspects of the present disclosure.

FIG. 4 shows an example slot format 410 with a normal cyclic prefix. The available time frequency resources may be partitioned into resource blocks. Each resource block may cover a set of subcarriers (e.g., 12 subcarriers) in one slot and may include a number of resource elements. Each resource element may cover one subcarrier in one symbol period (e.g., in time) and may be used to send one modulation symbol, which may be a real or complex value.

An interlace structure may be used for each of the downlink and uplink for FDD in certain telecommunications systems (e.g., NR). For example, Q interlaces with indices of 0 through Q−1 may be defined, where Q may be equal to 4, 6, 8, 10, or some other value. Each interlace may include slots that are spaced apart by Q frames. In particular, interlace q may include slots q, q+Q, q+2Q, etc., where q E {0, . . . , Q−1}.

A UE may be located within the coverage of multiple BSs. One of these BSs may be selected to serve the UE. The serving BS may be selected based at least in part on various criteria such as received signal strength, received signal quality, path loss, and/or the like. Received signal quality may be quantified by a signal-to-noise-and-interference ratio (SINR), or a reference signal received quality (RSRQ), or some other metric. The UE may operate in a dominant interference scenario in which the UE may observe high interference from one or more interfering BSs.

While aspects of the examples described herein may be associated with NR or 5G technologies, aspects of the present disclosure may be applicable with other wireless communication systems. New radio (NR) may refer to radios configured to operate according to a new air interface (e.g., other than Orthogonal Frequency Divisional Multiple Access (OFDMA)-based air interfaces) or fixed transport layer (e.g., other than Internet Protocol (IP)). In aspects, NR may utilize OFDM with a CP (herein referred to as cyclic prefix OFDM or CP-OFDM) and/or SC-FDM on the uplink, may utilize CP-OFDM on the downlink and include support for half-duplex operation using time division duplexing (TDD). In aspects, NR may, for example, utilize OFDM with a CP (herein referred to as CP-OFDM) and/or discrete Fourier transform spread orthogonal frequency-division multiplexing (DFT-s-OFDM) on the uplink, may utilize CP-OFDM on the downlink and include support for half-duplex operation using TDD. NR may include Enhanced Mobile Broadband (eMBB) service targeting wide bandwidth (e.g., 80 megahertz (MHz) and beyond), millimeter wave (mmW) targeting high carrier frequency (e.g., 60 gigahertz (GHz)), massive MTC (mMTC) targeting non-backward compatible MTC techniques, and/or mission critical targeting ultra reliable low latency communications (URLLC) service.

In some aspects, a single component carrier bandwidth of 100 MHZ may be supported. NR resource blocks may span 12 sub-carriers with a sub-carrier bandwidth of 60 or 120 kilohertz (kHz) over a 0.1 millisecond (ms) duration. Each radio frame may include 40 slots and may have a length of 10 ms. Consequently, each slot may have a length of 0.25 ms. Each slot may indicate a link direction (e.g., DL or UL) for data transmission and the link direction for each slot may be dynamically switched. Each slot may include DL/UL data as well as DL/UL control data.

Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells. Alternatively, NR may support a different air interface, other than an OFDM-based interface. NR networks may include entities such central units or distributed units.

As indicated above, FIG. 4 is provided as an example. Other examples may differ from what is described with regard to FIG. 4.

In a wireless network, a receiver (a UE or another type of wireless communication device that includes a receiver) may operate in various modes, such as an active mode (e.g., a mode where the majority of the modules and/or components of the receiver are active and operating), one or more power-saving modes (e.g., a low-power mode, an idle mode, a sleep mode, a discontinuous reception (DRX) mode, and/or the like), and/or the like. When a receiver is in a power-saving mode, one or more modules and/or components (e.g., a radio frequency receiver, a receiver front end, a baseband processor, a digital signal processor, and/or the like) of the receiver may be disabled and/or deactivated such that the modules and/or components consume fewer processing, memory, radio, and/or battery resources. Thus, the power-saving mode can extend the duration of a single charge of the receiver's battery, which in turn may enhance user experience of the receiver, extend the operating life of the receiver, decrease operational costs of the receiver, and/or decrease hardware costs of the receiver.

Various techniques have been introduced for transitioning a receiver out of a power-saving mode and into an active mode. One technique includes transmitting a signal to a UE, which may indicate that a physical downlink control channel (PDCCH) communication, and/or other communication, is to be transmitted for the UE. The signal may be referred to as a wakeup signal (WUS). The UE may temporarily transition out of the power-saving mode (e.g., by activating one or more modules and/or components, such as the baseband processor and/or the like) to monitor a downlink, between the UE and a BS, for the WUS during a time period. If the UE does not detect the presence of the WUS in the downlink during the time period, the UE may return to the power-saving mode until the UE is to again monitor the downlink for the WUS. If the UE detects the presence of the WUS in the downlink, the UE may transition to the active mode in order to receive the PDCCH communication.

A WUS may be implemented using various types of signals, sequences, transmissions, and/or the like. For example, a WUS may be reference signal-based (e.g., may be implemented by a channel state information reference signal (CSI-RS), a tracking reference signal (TRS), a demodulation reference signal (DMRS), and/or the like), may be PDCCH-based (e.g., may be implemented by a PDCCH communication), may be sequence-based (e.g., may be implemented by a Gold sequence, a Zadoff Chu sequence, and/or the like), and/or the like. A PDCCH WUS may be more robust relative to other types of wakeup signals in that a PDCCH WUS may have built-in coding and cyclic redundancy check (CRC) mechanisms.

To detect a PDCCH WUS, the UE may monitor numerous PDCCH candidate locations configured for the UE, and may perform blind decoding of the PDCCH candidate locations to determine whether the PDCCH WUS is located in any of the PDCCH candidate locations. A plurality PDCCH candidate locations may be configured for each search space set associated with the UE, a plurality of search space sets may be configured for each core resource set (CORESET) assigned to the UE, a plurality of CORESETs may be configured for each bandwidth part (BWP) associated with the UE, and the UE may be assigned a plurality of BWPs. Moreover, the PDCCH candidate locations and/or the search space sets configured for the UE may be used for other purposes in addition to the transmission of a PDCCH WUS. As a result, the UE needs to monitor and blindly decode a large quantity of PDCCH candidate locations in order to detect a PDCCH WUS, which increases the consumption of processing and/or memory resources of the UE, increases the time duration that the UE is temporarily out of a power-saving mode attempting to detect the PDCCH WUS (which in turn increases the consumption of battery resources of the UE), and/or the like.

Some aspects, described herein, provide techniques and apparatuses for search space set for wakeup signal. In some aspects, a dedicated search space set (e.g., a wakeup signal search space (WUS-SS) set) may be configured for a UE such that the WUS-SS set may specify PDCCH candidates for the purpose of carrying a PDCCH WUS. The UE may monitor the WUS-SS set for a PDCCH WUS and may detect the PDCCH WUS in the WUS-SS set based at least in part on monitoring the WUS-SS set. This reduces the quantity of PDCCH candidate locations that the UE is to monitor and blindly decode to detect the PDCCH WUS, which decreases processing, memory, and battery resource consumption of the UE while attempting to detect the PDCCH WUS. Moreover, since the WUS-SS set is specific to the purpose of transmitting and detecting the PDCCH WUS, parameters for the WUS-SS set (e.g., aggregation level, maximum quantity of PDCCH candidates per aggregation level, a control channel element (CCE) limit, a blind decoding limit, and/or the like) may be tailored for the purpose of PDCCH WUS, which may further decrease processing, memory, and battery resource consumption of the UE while attempting to detect the PDCCH WUS.

Figure 5:
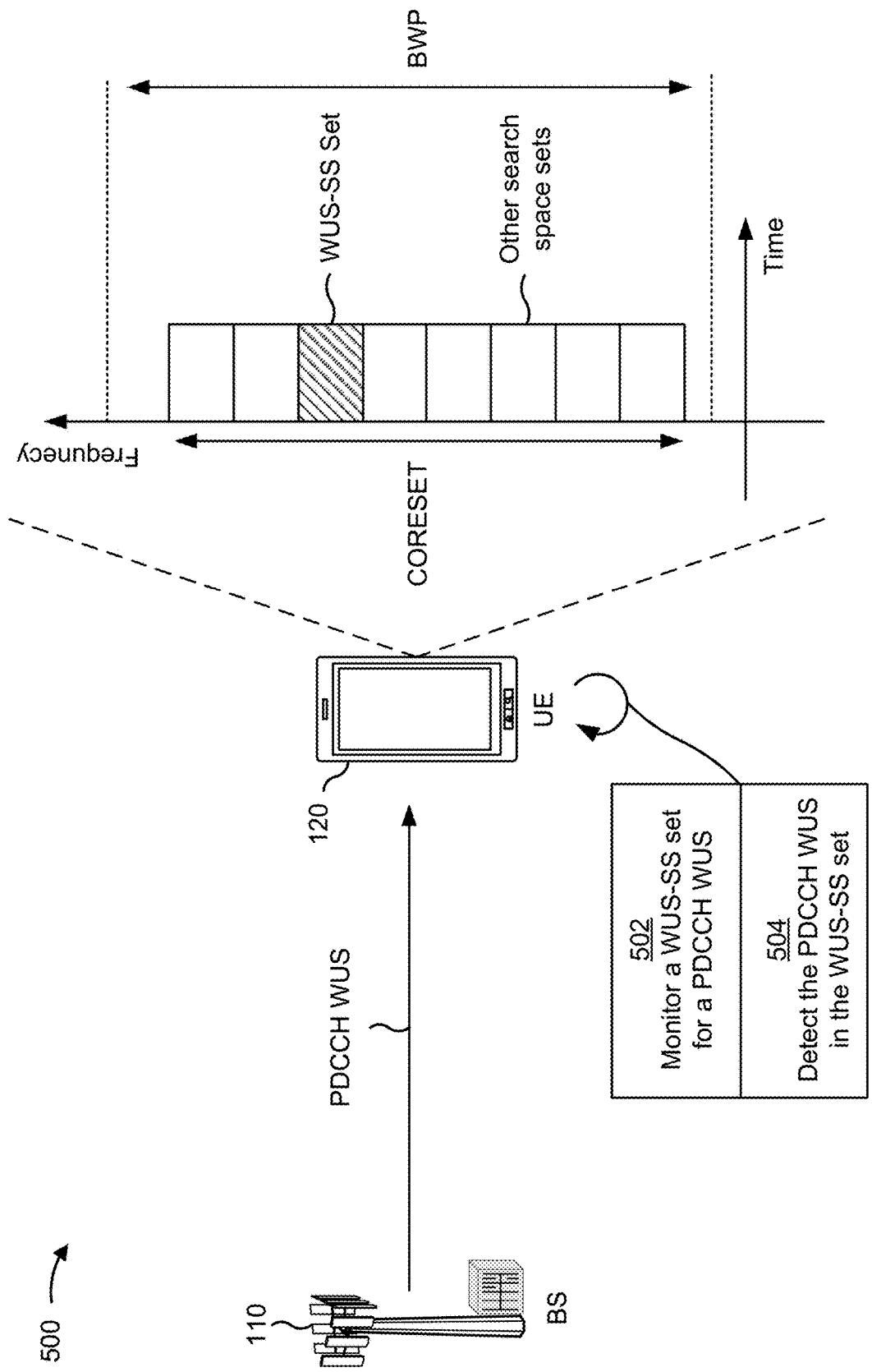
FIG. 5 is a diagram illustrating an example of a search space set for a wakeup signal, in accordance with various aspects of the present disclosure.

FIG. 5 is a diagram illustrating one or more examples 500 of a search space set for a wakeup signal, in accordance with various aspects of the present disclosure. As shown in FIG. 5, examples 500 may include a user equipment (e.g., UE 120) and a base station (e.g., BS 110). UE 120 and BS 110 may communicate via a wireless communication link. The wireless communication link may include an uplink and a downlink.

In some cases, UE 120 may operate in a power-saving mode as described above. For example, BS 110 may instruct UE 120 to operate in the power-saving mode (e.g., by transmitting a power-saving mode command to UE 120), UE 120 may operate in the power-saving mode based at least in part on not receiving communications for BS 110 (or other BSs) in a threshold amount of time, and/or the like. To transition UE 120 out of the power-saving mode and into an active mode (e.g., so that UE 120 may receive a PDCCH communication, a physical downlink shared channel (PDSCH) communication, and/or the like), BS 110 may transmit a PDCCH WUS to UE 120.

As shown in FIG. 5, and by reference number 502, UE 120 may monitor a WUS-SS set for the PDCCH WUS. As described above, the WUS-SS set may include a search space set that is dedicated and/or specific to the transmission and/or monitoring of a PDCCH WUS. In this way, UE 120 only needs to monitor the PDCCH candidates, configured by the WUS-SS set, for the PDCCH WUS transmitted from BS 110.

As further shown in FIG. 5, the WUS-SS set may be included in a CORESET configured for UE 120, which may be included in a BWP configured for UE 120. In some aspects, the CORESET and/or the BWP may respectively include a wakeup signal CORESET (WUS-CORESET) and a wakeup signal BWP (WUS-BWP). In this case, the WUS-CORESET and/or the WUS-BWP may be dedicated and/or specific to the transmission and/or monitoring of a PDCCH WUS. In some aspects, the CORESET and/or the BWP may respectively include a non-WUS-CORESET and a non-WUS-BWP. In this case, the non-WUS-CORESET and/or the non-WUS-BWP may include search space sets that may be used for other purposes (e.g., CSI-RS transmission, downlink data transmission, and/or the like).

In some aspects, BS 110 (and/or another device included in the wireless network) may configure the WUS-SS set for UE 120. In some aspects, BS 110 (and/or another device included in the wireless network) may configure a plurality of WUS-SS sets for UE 120. In this case, one or more WUS-SS sets may be configured for a CORESET associated with UE 120, one or more CORESETs may be configured for a BWP associated with UE 120, and/or one or more BWPs may be configured for UE 120.

In some aspects, BS 110 may configure UE 120 to monitor the WUS-SS set (and/or other WUS-SS sets). For example, BS 110 may transmit, to UE 120, one or more signaling communications that indicate UE 120 is to monitor the WUS-SS set for a PDCCH WUS. The one or more signaling communications may include a radio resource control (RRC) communication, a medium access control (MAC) control element (MAC-CE), a downlink control information (DCI) communication, and/or the like. In some aspects, UE 120 may be configured (e.g., when UE 120 is activated and/or deployed in the wireless network, when UE 120 communicatively connects to the wireless network, and/or the like) to monitor the WUS-SS set.

In some aspects, the one or more signaling communications may indicate a power-saving configuration for UE 120. In some aspects, UE 120 may be configured (e.g., when UE 120 is activated and/or deployed in the wireless network, when UE 120 communicatively connects to the wireless network, and/or the like) with the power-saving configuration. In some aspects, the power-saving configuration may explicitly identify the WUS-SS set, that UE 120 is to monitor, by indicating a search space set identifier associated with the WUS-SS set. The search space set identifier may include a specific search space set identifier (e.g., 10) that is reserved for the WUS-SS set. In some aspects, if the WUS-SS set is the only WUS-SS set configured for UE 120, the power-saving configuration may implicitly identify the WUS-SS set by indicating that UE 120 is to monitor a WUS-SS set.

The power-saving configuration may further indicate one or more parameters for the WUS-SS set. In some aspects, the one or more parameters for the WUS-SS set may be specified in the one or more signaling communications, a different signaling communication, and/or may be configured at UE 120 (e.g., when UE 120 is activated and/or deployed in the wireless network, when UE 120 communicatively connects to the wireless network, and/or the like). The one or more parameters may include, for example, a search space type associated with the WUS-SS set. The search space type may include a common search space (CSS) or a UE-specific search space (USS). In some aspects, the WUS-SS set may be configured such that the default search space type of the WUS-SS set is CSS. In this case, BS 110 may override the default search space type by indicating the search space type of the WUS-SS set in a signaling communication.

The WUS-SS set may be configured as a CSS set such that BS 110 may transmit the PDCCH WUS to a plurality of UEs (including UE 120) communicatively connected with BS 110, which may reduce the overhead of the PDCCH WUS. In this case, the PDCCH WUS may include a cell-specific PDCCH WUS, a group common PDCCH WUS (group common PDCCH carries the WUS for a group or multiple groups of UES in the cell), and/or the like. The WUS-SS set may be configured as a USS set such that BS 110 may transmit the PDCCH WUS to a specific UE (e.g., UE 120), which may increase the flexibility and control of the power-saving mode of the specific UE. In this case, the PDCCH WUS may include a UE-specific PDCCH WUS.

If the WUS-SS set is configured as a USS set, BS 110 may indicate the search space type of the WUS-SS via one or more RRC parameters in a UE-specific RRC configuration included in a signaling communication. The one or more RRC parameters may include a SearchSpace parameter, a PDCCH-Config parameter, a searchSpaceType parameter (e.g., set to "ue-Specific"), and/or the like.

If the WUS-SS set is configured as a CSS set, BS 110 may indicate the search space type of the WUS-SS via one or more RRC parameters in an RRC configuration included in a signaling communication. The RRC configuration may include a cell-specific RRC configuration or a UE-specific RRC configuration. The one or more RRC parameters may include a SearchSpace parameter, a PDCCH-Config parameter, a searchSpaceType parameter (e.g., set to "common"), and/or the like. Moreover, if the WUS-SS set is configured as a CSS set, the RRC configuration may further indicate a CSS type of the WUS-SS set. In some aspects, the CSS type may be indicated as a Type3-PDCCH CSS set, which may be a CSS type associated with other types of search space sets configured as a CSS set. In some aspects, the CSS type may be indicated as a CSS type dedicated and/or specific to WUS-SS sets (e.g., a Type4-PDCCH CSS set or another indicator).

In some aspects, the WUS-SS set maybe associated with an overbooking rule. The PDCCH overbooking rule may indicate whether PDCCH overbooking is permitted in the slots and/or symbols in which the WUS-SS set is located. In some cases, a UE may be limited to processing a particular quantity of blind decodes (which may be referred to as a blind decode limit) and/or CCEs (which may be referred to as a CCE limit) in a slot. If the configured PDCCHs for the slot exceeds the quantity of blind decodes and/or CCEs in the slot, this may be referred to as PDCCH overbooking. In some aspects, the WUS-SS may be configured (e.g., in a signaling communication, in a power-saving configuration, and/or the like) or specified in the standard such that PDCCH overbooking is not permitted in a slot in which the WUS-SS set is located. In some aspects, the WUS-SS may be configured such that a blind decode limit, for a slot associated with the WUS-SS set, is lower relative to a blind decode limit for another slot that is not associated with the WUS-SS set and/or a CCE limit, for the slot associated with the WUS-SS set, is lower relative to a CCE limit for the other slot that is not associated with the WUS-SS set, which may decrease processing, memory, and battery resource consumption of the UE while attempting to detect the PDCCH WUS.

In some aspects, the one or more parameters for the WUS-SS set may include an aggregation level parameter of the WUS-SS set. The aggregation level parameter may indicate a quantity of CCEs that are allocated per PDCCH. In some aspects, the one or more parameters for the WUS-SS set may include a PDCCH candidate parameter of the WUS-SS set. The PDCCH candidate parameter may indicate a quantity of PDCCH candidates that are allocated per aggregation level. In some aspects, the aggregation level and/or the quantity of PDCCH candidates per aggregation level may be configured separately from other search space sets allocated to UE 120. In some aspects, the aggregation level and/or the quantity of PDCCH candidates per aggregation level may be configured separately for the PDCCH WUS, in a particular search space set, from aggregation levels and/or quantities of PDCCH candidates per aggregation level that are not configured for the PDCCH WUS in the search space set. This may increase the flexibility of configuring the aggregation level and/or quantity of PDCCH candidates per aggregation level for the WUS-SS set and/or the PDCCH WUS. In some aspects, aggregation levels, for the PDCCH WUS, may include a subset of aggregation levels that are not configured for the PDCCH WUS in the search space set. In some aspects, a quantity of PDCCH candidates per aggregation level, for the PDCCH WUS, may include a subset of a quantity of PDCCH candidates per aggregation level that are not configured for the PDCCH WUS in the search space set.

In some aspects, the one or more parameters for the WUS-SS set may include a location parameter of the WUS-SS set. The location parameter may indicate a location of the WUS-SS set in one or more slots in the downlink of the wireless communication link between UE 120 and BS 110. For example, the location parameter may indicate that the WUS-SS set is located in one or more symbols (e.g., the first three symbols) at the beginning of a slot. In this case, an instance of the WUS-SS set, in a particular symbol, may be referred to as a WUS-SS occasion. In some aspects, the slot may be a slot in which no other search space sets are included and/or no other PDCCHs are monitored.

In some aspects, the one or more parameters for the WUS-SS set may include a repetition parameter of the WUS-SS set. The repetition parameter may indicate a quantity of slots across which WUS-SS occasions of the WUS-SS set are to be included. For example, the location parameter may indicate that a slot is to include four WUS-SS occasions of the WUS-SS set, and the repetition parameter may indicate that the four WUS-SS occasions of the WUS-SS are to be repeated for a plurality of slots. In some aspects, the repetition parameter may further indicate whether the symbols, in which WUS-SS occasions are included, are to be fixed across the plurality of slots (e.g., the same symbols include the WUS-SS occasions across the plurality of slots) or variable (e.g., different symbols may include the WUS-SS occasions in the plurality of slots).

UE 120 may monitor the WUS-SS set for a PDCCH WUS, transmitted from BS 110, based at least in part on the power-saving configuration, one or more signaling communications, and/or being configured to monitor the WUS-SS set for the PDCCH WUS. To monitor the WUS-SS set, UE 120 may transition out of the power-saving mode for a time duration, which may be referred to as a WUS occasion, and may monitor the WUS-SS set for the PDCCH WUS during the WUS occasion. The WUS occasion may correspond to one or more slots that include WUS-SS occasions of the WUS-SS set. In this way, UE 120 may transition out of the power-saving mode to monitor the WUS-SS set during the one or more slots.

In some aspects, if a slot, of the one or more slots, includes one or more WUS-SS occasions of the WUS-SS set and/or one or more occasions of one or more other search space sets, UE 120 may monitor a single occasion (e.g., a WUS-SS occasion or an occasion of another search space set) for the PDCCH WUS, which may decrease processing, memory, and battery resource consumption of the UE while attempting to detect the PDCCH WUS. In some aspects, if the one or more WUS-SS occasions and/or the one or more occasions of the one or more other search space sets are distributed across a plurality of CORESETs, UE 120 may monitor at most a single occasion (e.g., a WUS-SS occasion or an occasion of another search space set), of each CORESET of the plurality of CORESETs, for the PDCCH WUS. In some aspects, if a slot, of the one or more slots, includes one or more WUS-SS occasions of the WUS-SS set, UE 120 may monitor the slot for the one or more WUS-SS occasions and no other PDCCHs in the slot.

In some aspects, UE 120 may monitor the WUS-SS set only during one or more WUS occasions of the PDCCH WUS. In this case, UE 120 may ignore an RRC searchSpace configuration regarding the time domain properties of the WUS_SS set (e.g., periodicity, start, location, and/or the like). As indicated above, the WUS occasion may include a time duration where UE 120 wakes up from the power-saving mode to monitor for a PDCCH WUS, which may be separately specified by one or more power saving configurations. In some aspects, the WUS_SS set occasions of the WUS-SS set may be used to define the WUS occasion. For example, the start, end, and/or duration of the WUS occasion may be either the same as the WUS_SS occasion or includes the WUS_SS with pre-defined offsets to the start and end of the WUS occasion. In some aspects, UE 120 may monitor the WUS_SS set in a slot or a particular quantity of slots.

As further shown in FIG. 5, and by reference number 504, UE 120 may detect the PDCCH WUS in the WUS-SS set based at least in part on monitoring the WUS-SS set. To detect the PDCCH WUS, UE 120 may blindly decode the PDCCH candidates, included in the WUS-SS set, until UE 120 identifies the PDCCH WUS in a PDCCH candidate. If UE 120 does not identify a PDCCH WUS in any of the PDCCH candidates during the WUS occasion, UE 120 may return to the power-saving mode until the next WUS occasion. If UE 120 detects the PDCCH WUS in a PDCCH candidate, the PDCCH WUS may indicate that BS 110 is to transmit a PDCCH communication and/or a PDSCH communication to UE 120, and UE 120 may accordingly transition to the active mode in order to receive the PDCCH communication and/or PDSCH communication.

In this way, a dedicated search space set (e.g., a WUS-SS set) may be configured for UE 120 such that the WUS-SS set may specify PDCCH candidates for the purpose of carrying a PDCCH WUS. UE 120 may monitor the WUS-SS set for a PDCCH WUS and may detect the PDCCH WUS in the WUS-SS set based at least in part on monitoring the WUS-SS set. This reduces the quantity of PDCCH candidate locations that UE 120 is to monitor and blindly decode to detect the PDCCH WUS, which decreases processing, memory, and battery resource consumption of UE 120 while attempting to detect the PDCCH WUS. Moreover, since the WUS-SS set is specific to the purpose of transmitting and detecting the PDCCH WUS, parameters for the WUS-SS set (e.g., aggregation level, maximum quantity of PDCCH candidates per aggregation level, blind decode limits, CCE limits, and/or the like) may be tailored for the purpose of PDCCH WUS, which may further decrease processing, memory, and battery resource consumption of UE 120 while attempting to detect the PDCCH WUS.

As indicated above, FIG. 5 is provided as an example. Other examples may differ from what is described with respect to FIG. 5.

Figure 6:
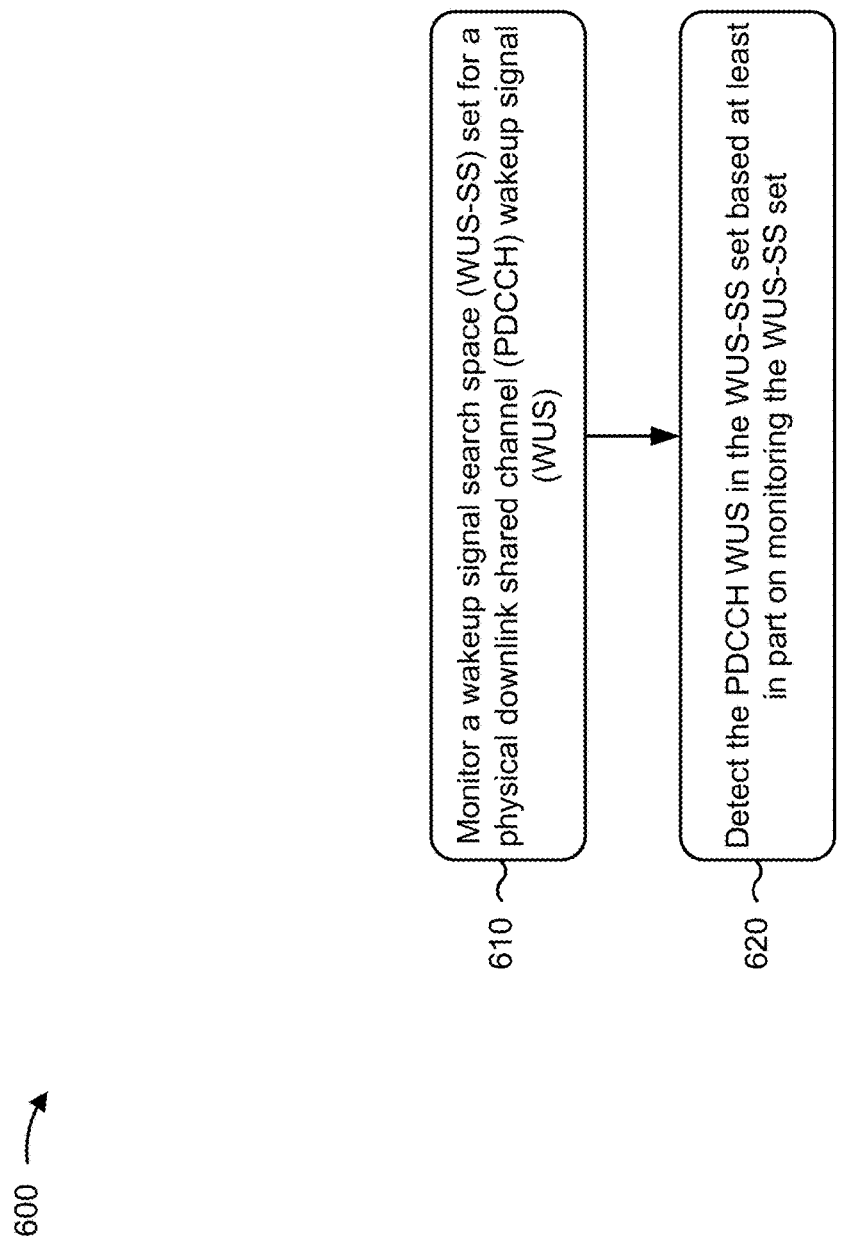
FIG. 6 is a diagram illustrating an example process performed, for example, by a user equipment (UE), in accordance with various aspects of the present disclosure.

FIG. 6 is a diagram illustrating an example process 600 performed, for example, by a UE, in accordance with various aspects of the present disclosure. Example process 600 is an example where a UE (e.g., UE 120) performs operations associated with search space set for wakeup signal.

As shown in FIG. 6, in some aspects, process 600 may include monitoring a WUS-SS set for a PDCCH WUS (block 610). For example, the UE (e.g., using receive processor 258, transmit processor 264, controller/processor 280, memory 282, and/or the like) may monitor a WUS-SS set for a physical PDCCH WUS, as described above.

As further shown in FIG. 6, in some aspects, process 600 may include detecting the PDCCH WUS in the WUS-SS set based at least in part on monitoring the WUS-SS set (block 620). For example, the UE (e.g., using receive processor 258, transmit processor 264, controller/processor 280, memory 282, and/or the like) may detect the PDCCH WUS in the WUS-SS set based at least in part on monitoring the WUS-SS set, as described above.

Process 600 may include additional aspects, such as any single implementation or any combination of aspects described below and/or in connection with one or more other processes described elsewhere herein.

In a first aspect, process 600 further comprises receiving a signaling communication that includes an indication of the WUS-SS set, and monitoring the WUS-SS set for the PDCCH WUS comprises monitoring the WUS-SS set based at least in part on the indication of the WUS-SS set. In a second aspect, alone or in combination with the first aspect, the indication of the WUS-SS set comprises a search space set identifier associated with the WUS-SS set. In a third aspect, alone or in combination with any of the first through second aspects, the signaling communication comprises at least one of an RRC communication, a MAC-CE communication, or a DCI communication.

In a fourth aspect, alone or in combination with any of the first through third aspects, the WUS-SS set is associated with a WUS-CORESET. In a fifth aspect, alone or in combination with any of the first through fourth aspects, the WUS-SS set is associated with a WUS-BWP. In a sixth aspect, alone or in combination with any of the first through fifth aspects, the WUS-SS set is associated with a search space type, and the search space type comprises a CSS, or a USS. In a seventh aspect, alone or in combination with any of the first through sixth aspects, the CSS is a default search space type for the WUS-SS set. In an eighth aspect, alone or in combination with any of the first through seventh aspects, the search space type, associated with the WUS-SS set, is indicated in a signaling communication. In a ninth aspect, alone or in combination with any of the first through eighth aspects, the WUS-SS set is associated with a WUS CSS type, and the WUS CSS type, associated with the WUS-SS set, is indicated by a cell-specific RRC configuration included in a signaling communication, or a UE-specific RRC configuration included in the signaling communication.

In a tenth aspect, alone or in combination with any of the first through ninth aspects, a search space type, associated with the WUS-SS set, comprises a CSS, and a CSS type, associated with the WUS-SS set, is indicated by a UE-specific RRC configuration. In some aspects, the CSS type, associated with the WUS-SS set, is indicated as a Type3-PDCCH CSS set in the UE-specific RRC configuration. In an eleventh aspect, alone or in combination with any of the first through tenth aspects, PDCCH overbooking is not permitted for a slot associated with the WUS-SS set. In a twelfth aspect, alone or in combination with any of the first through eleventh aspects, at least one of a blind decode limit, for a slot associated with the WUS-SS set, is lower relative to a blind decode limit for another slot that is not associated with the WUS-SS set, or a CCE limit, for the slot associated with the WUS-SS set, is lower relative to a CCE limit for the other slot that is not associated with the WUS-SS set.

In a thirteenth aspect, alone or in combination with any of the first through twelfth aspects, the PDCCH WUS is configured to be monitored in a search space set by the UE, an aggregation level and a quantity of PDCCH candidates, for the PDCCH WUS in the search space set, are configured separately from an aggregation level and a quantity of PDCCH candidates for another search space set associated with the UE, and the aggregation level and the quantity of PDCCH candidates, for the PDCCH WUS in the search space set, are configured separately from an aggregation level and a quantity of PDCCH candidates that are not for the PDCCH WUS in the search space set associated with the UE.

In a fourteenth aspect, alone or in combination with any of the first through thirteenth aspects, the PDCCH WUS is configured to be monitored in a search space set for the UE, and at least one of aggregation levels, for the PDCCH WUS, include a subset of available aggregation levels that are not configured for the PDCCH WUS in the search space set or a quantity of PDCCH candidates per aggregation level, for the PDCCH WUS, includes a subset of a quantity of PDCCH candidates per aggregation level that are not configured for the PDCCH WUS in the search space set. In a fifteenth aspect, alone or in combination with any of the first through fourteenth aspects, the WUS-SS set is located in one or more symbols at a beginning of a slot. In a sixteenth aspect, alone or in combination with any of the first through fifteenth aspects, respective occasions, of the WUS-SS set, are included in span of one or more symbols in a fixed location in a plurality of slots. In seventeenth aspect, alone or in combination with any of the first through sixteenth aspects, respective occasions, of the WUS-SS set, are included in different locations in a plurality of slots.

In an eighteenth aspect, alone or in combination with any of the first through seventeenth aspects, PDCCH WUS is monitored in a slot that includes respective pluralities of occasions of one or more search space sets in the slot, and monitoring the PDCCH WUS comprises monitoring a single occasion, of the pluralities of occasions of one or more search space sets, in the slot. In a nineteenth aspect, alone or in combination with any of the first through eighteenth aspects, PDCCH WUS is monitored in a slot that includes respective pluralities of occasions of more than one search space sets, the more than one search space sets are included in one or more CORESETs, and monitoring the PDCCH WUS comprises monitoring at most one respective search space set occasion for each CORESET of the one or more CORESETs.

In a twentieth aspect, alone or in combination with any of the first through nineteenth aspects, the WUS-SS set is included in a slot in which no other search space sets are included. In a twenty-first aspect, alone or in combination with any of the first through twentieth aspects, the WUS-SS set is included in a slot in which no other PDCCHs are monitored. In a twenty-second aspects, alone or in combination with any of the first through twenty-first aspects, monitoring the WUS-SS set for the PDCCH WUS comprises: transitioning out of a power-saving mode for a WUS occasion; and monitoring the WUS-SS set during the WUS occasion. In a twenty-third aspect, alone or in combination with any of the first through twenty-second aspects, the WUS occasion corresponds to one or more slots that include WUS-SS occasions included in the WUS-SS set. In a twenty-fourth aspect, alone or in combination with any of the first through twenty-third aspects, monitoring the WUS-SS set for the PDCCH WUS comprises monitoring the WUS-SS set in one or more slots.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

Some aspects are described herein in connection with thresholds. As used herein, satisfying a threshold may refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c"

is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A user equipment (UE) for wireless communication, comprising:
   a memory; and
   one or more processors, coupled to the memory, configured to:
      monitor, while the UE is in a power-saving mode, a wakeup signal search space (WUS-SS) set for a physical downlink control channel (PDCCH) wakeup signal (WUS), in a slot associated with the WUS-SS set, wherein the PDCCH WUS includes information to transition the UE out of the power-saving mode and into an active mode in order to receive a PDCCH communication, and wherein PDCCH overbooking is not permitted for the slot; and
      detect the PDCCH WUS in the WUS-SS set based at least in part on monitoring the WUS-SS set.

2. The UE of claim 1,
   wherein the one or more processors are further configured to:
      receive a signaling communication that includes an indication of the WUS-SS set, and
   wherein one or more processors, when monitoring the WUS-SS set for the PDCCH WUS, are to:
      monitor the WUS-SS set based at least in part on the indication of the WUS-SS set.

3. The UE of claim 2, wherein the indication of the WUS-SS set comprises:
   a search space set identifier associated with the WUS-SS set.

4. The UE of claim 2, wherein the signaling communication comprises at least one of:
   a radio resource control (RRC) communication,
   a medium access control (MAC) control element (MAC-CE) communication, or
   a downlink control information (DCI) communication.

5. The UE of claim 1, wherein the WUS-SS set is associated with a search space type.

6. The UE of claim 5, wherein the search space type comprises a common search space (CSS).

7. The UE of claim 6, wherein the CSS is a default search space type for the WUS-SS set.

8. The UE of claim 6, wherein the search space type, associated with the WUS-SS set, is indicated in a signaling communication.

9. The UE of claim 1, wherein the WUS-SS set is associated with a WUS common search space (CSS) type, and
   wherein the WUS CSS type, associated with the WUS-SS set, is indicated by:
      a cell-specific radio resource control (RRC) configuration included in a signaling communication, or
      a UE-specific RRC configuration included in the signaling communication.

10. The UE of claim 1, wherein the WUS-SS is associated with an overbooking rule that indicates that the PDCCH overbooking is not permitted for the slot.

11. The UE of claim 1, wherein the PDCCH WUS is configured to be monitored in a search space set by the UE.

12. UE of claim 11, wherein an aggregation level, for the PDCCH WUS in the search space set, is configured separately from an aggregation level for another search space set associated with the UE.

13. The UE of claim 12, wherein the aggregation level, for the PDCCH WUS in the search space set, is configured separately from an aggregation level that is not for the PDCCH WUS in the search space set associated with the UE.

14. The UE of claim 11, wherein a quantity of PDCCH candidates, for the PDCCH WUS in the search space set, is configured separately from an aggregation level and a quantity of PDCCH candidates for another search space set associated with the UE.

15. The UE of claim 14, wherein the quantity of PDCCH candidates, for the PDCCH WUS in the search space set, is configured separately from a quantity of PDCCH candidates that is not for the PDCCH WUS in the search space set associated with the UE.

16. The UE of claim 11, wherein aggregation levels, for the PDCCH WUS, include a subset of available aggregation levels that are not configured for the PDCCH WUS in the search space set.

17. The UE of claim 11, wherein a quantity of PDCCH candidates per aggregation level, for the PDCCH WUS, includes a subset of a quantity of PDCCH candidates per aggregation level that are not configured for the PDCCH WUS in the search space set.

18. A method of wireless communication performed by a user equipment (UE), comprising:
   monitoring, while the UE is in a power-saving mode, a wakeup signal search space (WUS-SS) set for a physical downlink control channel (PDCCH) wakeup signal (WUS) in a slot associated with the WUS-SS set, wherein the PDCCH WUS includes information to transition the UE out of the power-saving mode and into an active mode in order to receive a PDCCH communication, and wherein PDCCH overbooking is not permitted for the slot; and
   detecting the PDCCH WUS in the WUS-SS set based on monitoring the WUS-SS set.

19. The method of claim 18, wherein the WUS-SS set is associated with a search space type.

20. The method of claim 19, wherein the search space type comprises a common search space (CSS).

21. The method of claim 18, wherein the WUS-SS is associated with an overbooking rule that indicates that the PDCCH overbooking is not permitted for the slot.

22. The method of claim 18, wherein the PDCCH WUS is configured to be monitored in a search space set by the UE.

23. The method of claim 22, wherein an aggregation level, for the PDCCH WUS in the search space set, is configured separately from an aggregation level for another search space set associated with the UE.

24. The method of claim 22, wherein a quantity of PDCCH candidates, for the PDCCH WUS in the search space set, is configured separately from an aggregation level and a quantity of PDCCH candidates for another search space set associated with the UE.

25. The method of claim 22, wherein aggregation levels, for the PDCCH WUS, include a subset of available aggregation levels that are not configured for the PDCCH WUS in the search space set.

26. The method of claim 22, wherein a quantity of PDCCH candidates per aggregation level, for the PDCCH WUS, includes a subset of a quantity of PDCCH candidates per aggregation level that are not configured for the PDCCH WUS in the search space set.

27. A non-transitory computer-readable medium storing one or more instructions for wireless communication, the one or more instructions comprising:
one or more instructions that, when executed by one or more processors of a user equipment (UE), cause the one or more processors to:
monitor, while the UE is in a power-saving mode, a wakeup signal search space (WUS-SS) set for a physical downlink control channel (PDCCH) wakeup signal (WUS) in a slot associated with the WUS-SS set, wherein the PDCCH WUS includes information to transition the UE out of the power-saving mode and into an active mode in order to receive a PDCCH communication, and wherein PDCCH overbooking is not permitted for the slot; and
detect the PDCCH WUS in the WUS-SS set based on monitoring the WUS-SS set.

28. The non-transitory computer-readable medium of claim 27, wherein the WUS-SS set is associated with a search space type.

29. The non-transitory computer-readable medium of claim 28, wherein the search space type comprises a common search space (CSS).

30. An apparatus for wireless communication, comprising:
means for monitoring, while the apparatus is in a power-saving mode, a wakeup signal search space (WUS-SS) set for a physical downlink control channel (PDCCH) wakeup signal (WUS) in a slot associated with the WUS-SS set, wherein the PDCCH WUS includes information to transition the apparatus out of the power-saving mode and into an active mode in order to receive a PDCCH communication, and wherein PDCCH overbooking is not permitted for the slot; and
means for detecting the PDCCH WUS in the WUS-SS set based on monitoring the WUS-SS set.

* * * * *